US007144484B2

(12) United States Patent
Rejda et al.

(10) Patent No.: US 7,144,484 B2
(45) Date of Patent: Dec. 5, 2006

(54) ION MILL SHUTTER SYSTEM

(75) Inventors: Edwin Frank Rejda, Bloomington, MN (US); Joel William Hoehn, Hudson, WI (US); Shanlin Hao, Eden Prairie, MN (US); Lance Eugene Stover, Eden Prairie, MN (US); Todd Arthur Luse, Delano, MN (US); James Richard Peterson, Eden Prairie, MN (US)

(73) Assignee: Seagate Technology LLC, Scotts Valley, CA (US)

(*) Notice: Subject to any disclaimer, the term of this patent is extended or adjusted under 35 U.S.C. 154(b) by 763 days.

(21) Appl. No.: 09/930,741

(22) Filed: Aug. 15, 2001

(65) Prior Publication Data

US 2002/0057537 A1 May 16, 2002

Related U.S. Application Data

(60) Provisional application No. 60/225,348, filed on Aug. 15, 2000, provisional application No. 60/241,217, filed on Oct. 13, 2000.

(51) Int. Cl.
*C23C 14/34* (2006.01)
*H01L 21/306* (2006.01)

(52) U.S. Cl. .......................... 204/298.36; 204/298.32; 156/345.24; 156/345.25; 156/345.28

(58) Field of Classification Search ........... 204/192.32, 204/192.35, 192.37, 298.03, 298.11, 298.26, 204/298.32, 192.33, 298.36; 156/345.3, 156/345.39, 345.28, 345.24, 345.25, 345.26, 156/345.27; 216/66, 94, 59, 60, 61, 57; 118/720, 118/721, 504, 665, 688, 663, 664, 666, 669; 250/492.22, 492.23; 427/10, 282

See application file for complete search history.

(56) References Cited

U.S. PATENT DOCUMENTS

| | | | | |
|---|---|---|---|---|
| 3,193,408 | A * | 7/1965 | Triller | 427/99 |
| 3,400,687 | A * | 9/1968 | Lueck | 118/712 |
| 4,024,291 | A * | 5/1977 | Wilmanns | 427/10 |
| 5,777,542 | A | 7/1998 | Ohsawa et al. | 338/32 R |
| 5,796,560 | A | 8/1998 | Saito et al. | 360/113 |
| 5,799,388 | A * | 9/1998 | Shouji | 29/603.09 |
| 5,805,389 | A | 9/1998 | Saito et al. | 360/113 |
| 6,045,671 | A * | 4/2000 | Wu et al. | 204/298.11 |
| 6,074,707 | A * | 6/2000 | Nakazawa et al. | 427/547 |
| 6,077,618 | A | 6/2000 | Sakakima et al. | 428/693 |
| 6,111,729 | A | 8/2000 | Kamiguchi et al. | 360/324.1 |
| 6,178,070 | B1 | 1/2001 | Hong et al. | 360/317 |
| 6,198,378 | B1 | 3/2001 | Saito et al. | 338/32 R |
| 6,201,465 | B1 | 3/2001 | Saito et al. | 338/32 R |
| 6,258,468 | B1 | 7/2001 | Mahvan et al. | 428/679 |
| 6,287,476 | B1 | 9/2001 | Ju et al. | 216/47 |
| 6,324,036 | B1 | 11/2001 | Dill, Jr. et al. | 360/320 |

FOREIGN PATENT DOCUMENTS

| | | | |
|---|---|---|---|
| JP | 09-243822 | * | 9/1997 |

* cited by examiner

*Primary Examiner*—Rodney G. McDonald

(57) ABSTRACT

A method for producing magneto resistive heads includes the steps of positioning at least two magneto resistive elements in spaced relation to one another and placing the at least two magneto resistive elements in an ion milling environment where material is removed nonselectively from items in the environment. A property of at least two of the plurality of magneto resistive elements is monitored. In response to monitoring, one of the at least two magneto resistive elements is dynamically covered to prevent additional removal of material from the covered magneto resistive element.

22 Claims, 11 Drawing Sheets

ION MILL SHUTTER SYSTEM

RELATED APPLICATION

This application claims the benefit of U.S. Provisional Application Ser. No. 60/225,348 filed Aug. 15, 2000 under 35 USC 119(e) and U.S. Provisional Application 60/241,217 filed Oct. 13, 2000.

FIELD OF THE INVENTION

The present invention relates to the field of mass storage devices. More particularly, this invention relates to magneto resistive ("MR") heads used in a disc drive.

BACKGROUND OF THE INVENTION

Many disc drives today use a transducer formed of two elements. A first element is a thin film head that is used for writing information representative of data to the surface of the memory disc. A second element is a magneto resistive element or giant magneto resistive element ("MR element") that is used to read information representative of data from the surface of the memory disc. The resistance of the MR element changes in the presence of a magnetic field so the MR element is used to sense transitions on the disc that have been previously written with the thin film write element. The transducer is typically housed within a small ceramic block called a slider. The slider is passed over the rotating disc in close proximity to the disc that includes magnetic transitions representative of data.

The process of forming individual sliders starts with forming multiple transducers on a surface of a ceramic wafer using semiconductor fabrication techniques. After forming the transducers on the wafer, the wafer is then sliced or cut to form an elongated bar having a row of transducers (a rowbar). MR elements include an MR stripe. The resistivity of the MR element is a function of the stripe height. As a result, manufacturing includes removal of material to produce a stripe height that produces a head with a certain specified resistivity. During manufacture, the elongated rows of transducers are placed in carriers and initially lapped to smooth the surface and provide a first "rough approximation" removal of material.

After lapping, the elongated rows of transducers are placed in a vacuum chamber and ion milled. Ion milling removes material at a slower, more controlled rate than the lapping process. Ion-beam etching or ion milling is a physical process. The wafers are placed on a holder in a vacuum chamber and a stream of argon is introduced into the chamber. Upon entering the chamber, the argon is subjected to a stream of high-energy electrons from a set of cathode (−) and anode (+) electrodes. The electrons ionize the argon atoms to a high-energy state with a positive charge. The wafers are held on a negatively grounded holder. The grounded holder attracts the ionized argon atoms. As the argon atoms travel to the wafer holder they accelerate, picking up energy. At the wafer surface they crash into the exposed wafer layer and literally blast small amounts from the wafer surface. Scientists call this physical process momentum transfer. No chemical reaction takes place between the argon atoms and the wafer material. Ion beam etching is also called sputter etching or ion milling.

This manufacturing process has problems. The initial steps of forming the MR elements using semiconductor fabrication techniques does not produce MR elements having uniform stripe heights. The removal of material from the sliced wafer or row of ceramic material, both by lapping and by ion milling, removes about the same amount of material from every MR element associated with a row of MR elements. The result is that the resistivity of the MR elements varies across the row of MR elements sliced from the ceramic wafer. In other words, the methods for removing material from a row of MR elements held on a holder treats each MR element in the row uniformly resulting in a wide distribution of stripe heights and a wide distribution of resistivity associated with the individual MR elements across the row of MR elements.

The semiconductor processes for removing materials generally treat the entire surface of a substrate uniformly. Generally, if more material is to be removed from one portion of a surface than another, the portion of the surface that is not to have more material removed is covered with a mask. Making structures using semiconductor techniques requires that a series of masks be laid down or used to cover certain portions of a substrate while additional materials are removed or added to form the structure. Generally, there is no way to move the mask during a semiconductor process. After one process is complete, the old mask is removed and a new mask is placed thereon to add material or remove material to form the structure.

Still another problem associated with the manufacturing process is that feedback as to the stripe height or resistivity of the MR element is not obtained during manufacture.

What is needed is a method and apparatus that can be used to carefully control the stripe height dimension of individual MR elements within a row of MR elements. Since the resistivity of the MR element is related to the stripe height, if each MR element is carefully controlled, the signal output of each MR element can be carefully controlled to have values within a selected range. The MR elements can also be controlled so that the deviation amongst the population of the individual MR elements is small. There is also a need for a process that uses feedback to control the stripe height and resistivity of the MR element during manufacture. If the dimensions or the stripe height dimension of the MR element can be controlled, MR elements can be reliably manufactured that will operate so that transitions written very closely together, such as at a very high areal density, may be detected or read. What is also needed is a method and apparatus that is both reliable and quick, such that it can be used to produce MR elements.

SUMMARY OF THE INVENTION

A device of the present invention for use during a semiconductor fabrication process includes a target and a mechanism for covering a portion of a target to prevent exposure of the portion of the target from the semiconductor fabrication process while an uncovered portion remains subjected to the semiconductor process. There is also a method used with the device.

A method for producing magneto resistive heads includes the steps of positioning at least two magneto resistive elements in spaced relation to one another and placing the at least two magneto resistive elements in an environment where material is removed nonselectively from items in the environment. A property of at least two of the plurality of magneto resistive elements is monitored. In response to monitoring, one of the at least two magneto resistive elements is dynamically covered to prevent additional removal of material from the covered magneto resistive element. The monitoring step further includes the steps of electrically connecting the at least two magneto resistive elements, and measuring the electrical resistance of the at least two magneto resistive elements. Dynamically covering one of the magneto resistive elements takes place when the electrical resistance of at least one of the magneto resistive elements meets a selected level. In one embodiment, the method includes placing the at least two magneto resistive elements in an ion milling environment. The step of dynamically covering one of the at least two of the magneto resistive elements further includes actuating a shutter to substantially cover one of the at least two magneto resistive elements during ion milling. The shutter has a width that is larger than the width of one magneto resistive element.

A device of the present invention for use in semiconductor fabrication includes a carrier, an elongated element held by the carrier, and a dynamic mask that can be used to selectively cover portions of the elongated element during semiconductor processes to substantially halt the semiconductor process with respect to the covered portion of the elongated element. The dynamic mask further includes a first shutter, a second shutter, and an actuator for moving the first shutter and the second shutter. The device also includes a controller for the actuator. The controller actuates each of the first shutter and the second shutter between an open position where the shutter is not covering a portion of the elongated element and a covering position where the shutter is covering a portion of the elongated element. The device further includes a mechanism for measuring a property associated with a selected portion of the elongated element. The controller actuates the first shutter and the second shutter in response to a selected value of a measured property. In one embodiment, the elongated element is a row of a plurality of magneto resistive elements sliced from a wafer.

In another embodiment, at least two of the magneto resistive elements of the row of a plurality of magneto resistive elements are monitored for electrical resistance. The controller actuates each of the first shutter and the second shutter between an open position, where the shutter is not covering a portion of the elongated element, and a covering position, where the shutter is covering a portion of the elongated element in response to the electrical resistance associated with that portion of the elongated element being at a predefined value. In one embodiment, the first shutter has a width larger than the width of at least one magneto resistive element. In another embodiment, the first shutter has a width larger than the width of one magneto resistive element and less than the width of two magneto resistive elements. In still another embodiment, the first shutter has a width larger than the width of at least two magneto resistive elements. The electrical resistance is measured during the semiconductive process of ion milling and the controller moves at least one of the first shutter and the second shutter over at least one of the magneto resistive elements during the process of ion milling. The shutter has a width to substantially protect the magneto resistive element below the shutter from removal of material when the shutter is placed in a covering position over the magneto resistive element. A magneto resistive element includes a stripe having a stripe height. The resistance measured across a magneto resistive element is related to the stripe height.

Advantageously, the method and apparatus allows for careful control of the dimensions of an MR element or set of MR elements so that the signal output of each MR element can be within a selected, optimized range. The method and apparatus is both quick and reliable, such that the method and apparatus can be used in production of MR elements for disc drives. As a result of the ability to control dimensions or a particular dimension of the MR element, information stored at higher areal density can be reliably detected or read. Yet another advantage is that MR elements in a population can be made to be more uniform across a population of MR elements. In other words, the standard deviation of the MR elements is reduced that enhances the ability to introduce higher capacity disc drives using this technology. Thus, disc drives capable of still further increases in storage capacity can be produced at the manufacturing level.

DETAILED DESCRIPTION

In the following detailed description of the preferred embodiments, reference is made to the accompanying drawings, which form a part hereof, and in which are shown by way of illustration specific embodiments in which the invention may be practiced. It is to be understood that other embodiments may be utilized and structural changes may be made without departing from the scope of the present invention.

Figure 1:
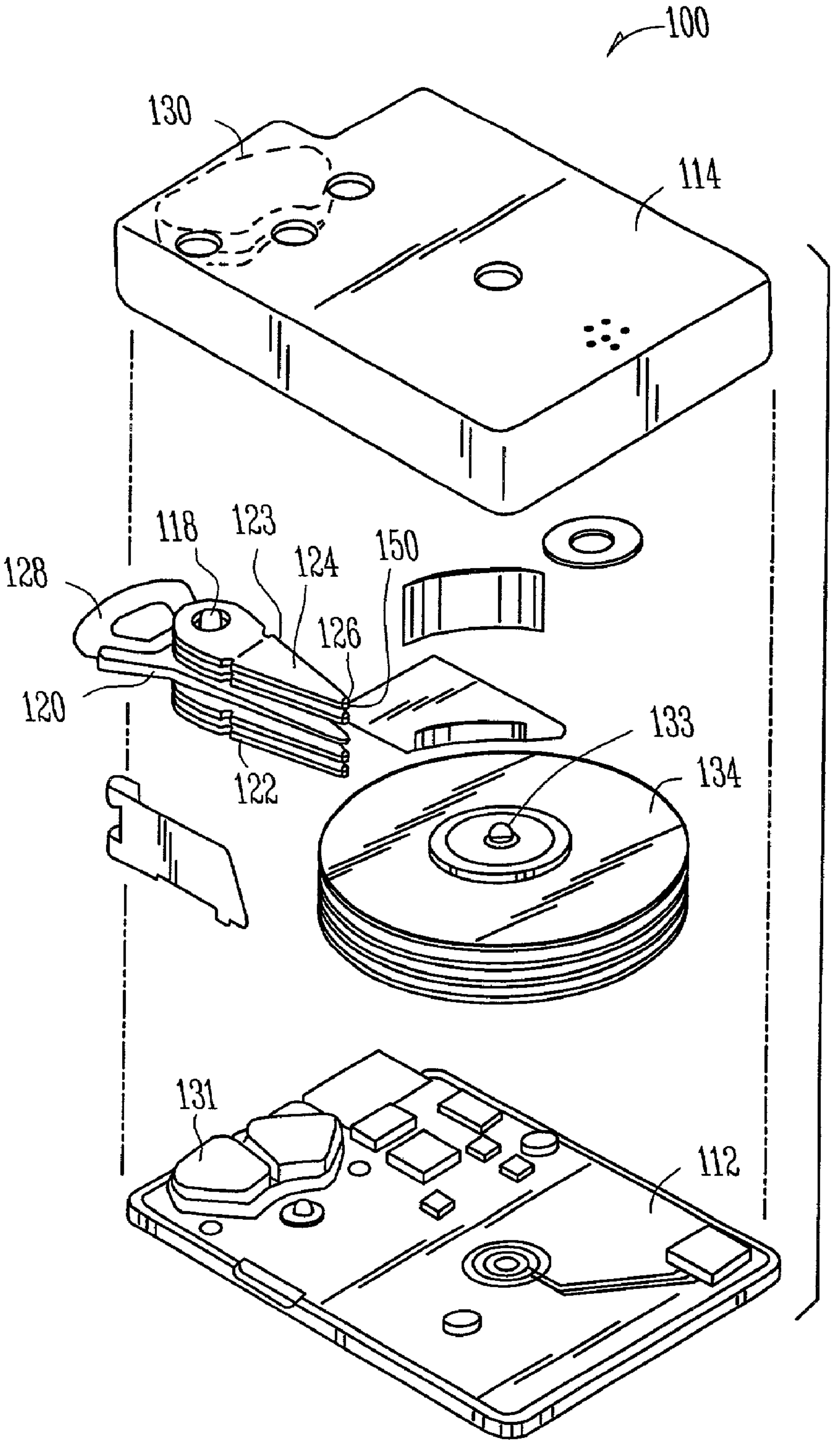
FIG. 1 is an exploded view of a disc drive with a multiple disc stack.

The invention described in this application is useful in any semiconductor fabrication process where it may be advantageous to control the process while it is occurring. One such process is during the removal of material from a bar of sliders 126 that will be used in a disc drive 100. FIG. 1 is an exploded view of one type of disc drive 100. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 that carries a magnetic transducer 150. The slider 126 with the transducer 150 form what is many times called the head. The slider 126 shown includes a transducer with a separate read element and a separate write element. On the end of the actuator arm assembly 120 opposite the load springs 124 and the sliders 126 is a voice coil 128.

Attached within the base 112 is a pair of magnets 130 and 130 . The pair of magnets 130 and 131, and the voice coil 128 are the key components of a voice coil motor that applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to such other disc drives.

Moving the actuator assembly 120 moves all the load springs 124. In operation, the actuator assembly 120 is moved to a park position when the disc drive is powered down. Moving the actuator to the park position causes the sliders to move to a non-data area of the disc. The non-data area is typically at the inner diameter ("ID") of the disc 134.

Figure 2:
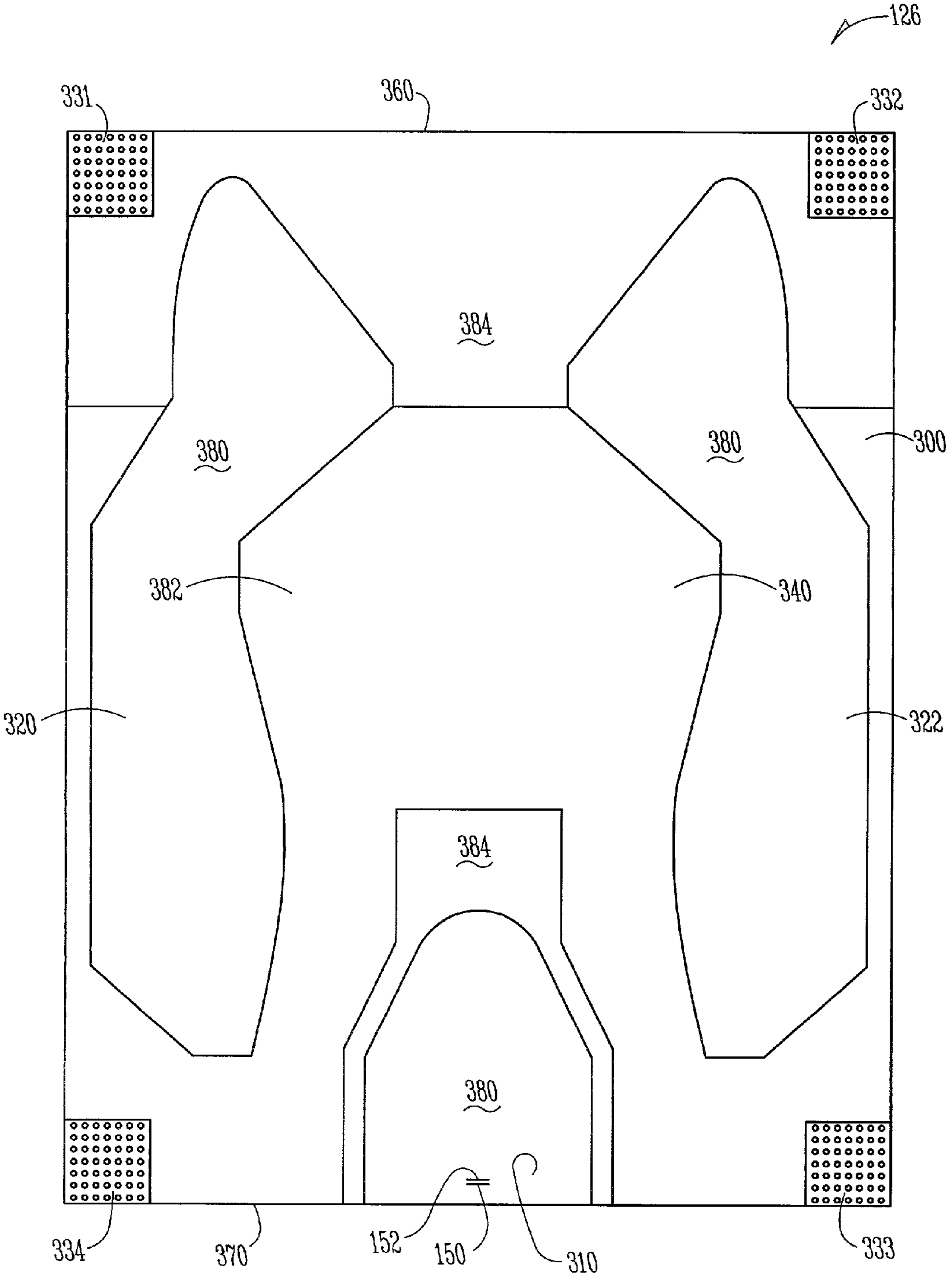
FIG. 2 is a bottom view of a slider showing the air-bearing surface of a slider that includes a thin film write element and a magneto resistive read element.

FIG. 2 is a bottom view of a slider 126 showing an air-bearing surface 300. The air-bearing surface includes a center island 310, a first side rail 320 and a second side rail 322. The air-bearing surface 300 includes contact portions that contact the disc 134 during take-off and landing of the slider 126. The center island 310 and side rails 320 and 322 may contact the disc if the disc drive is a contact start stop disc drive. A cavity 340 is typically formed between the side rails 320 and 322 as well as the center island 310. The cavity 340 is a noncontact portion of the air-bearing surface 300. The slider also has a leading edge 360 and a trailing edge 370. Positioned at or near the trailing edge 370 is the transducer denoted generally by reference number 150.

As shown in FIG. 2, the transducer 150 includes a separate read element 152 and a write element 156. The write element 156 is a thin film head that is positioned on the trailing edge 370 of the slider 126. The read element 152 is an MR element positioned in from the trailing edge 370 of the slider 126. It should be noted that an MR element may include a giant MR or super MR element. The MR element 152 is shielded from the write element 156. The initial step in forming a slider 126 is to form a plurality of MR elements 152 and write elements 156 on a wafer. The MR element (read element 152) and the thin film head (write element 156) are formed on a wafer using semiconductor fabrication techniques. The MR elements 152 and write elements 156 are placed on a wafer so that the wafer may be cut or sliced to form a bar that includes a row of the plurality of transducers 150. Once formed the wafer is cut or diced to form the elongated bar containing a row of transducers. These elongated rows of transducers are placed in carriers and initially lapped to smooth the surface and provide a first "rough" removal of material. After lapping, additional material is removed from the lapped surface rows of transducers. The bars of elongated rows of transducers are placed in a vacuum chamber and ion milled. This removes material at a slower, more controlled rate than the lapping process. The surface that is lapped is the surface that corresponds to the air bearing surface 300 of a finished slider 126.

Ion beam etching or ion milling is a physical process. There are a number of methods that can be used to remove material. One method of ion milling is described here as an example. The wafers are placed on a holder in a vacuum chamber and a stream of argon is introduced into the chamber. Upon entering the chamber, the argon is subjected to a stream of high-energy electrons from a set of cathode (−) and anode (+) electrodes. The electrons ionize the argon atoms to a high-energy state with a positive charge. The wafers are held on a negatively grounded holder that attracts the ionized argon atoms. As the argon atoms travel to the wafer holder they accelerate, picking up energy. At the wafer surface they crash into the exposed wafer layer and literally blast small amounts from the wafer surface. Scientists call this physical process momentum transfer. No chemical reaction takes place between the argon atoms and the wafer material. Ion beam etching is also called sputter etching or ion milling. Material removal (etching) using ion milling is highly directional (anisotropic).

Figure 3:
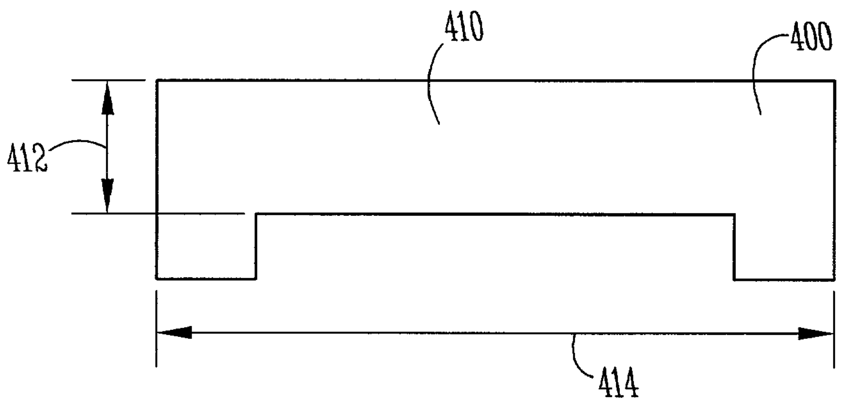
FIG. 3 is a cutaway side view of a magneto resistive element.

The lapping and ion milling removes material from the magneto resistive element. Even after lapping and ion milling, the standard deviation for resistance associated with the magneto resistance element is rather high. FIG. 3 is a cutaway side view of a magneto resistive element. A magneto resistive element 400 includes a stripe 410 that has a width or height, 412, and a length 414. The stripe height 412 is related to the resistance of the magneto resistive element 400 as discussed above. Lapping and ion milling remove material in an attempt to produce a stripe 410 having a selected stripe height 412.

Figure 4:
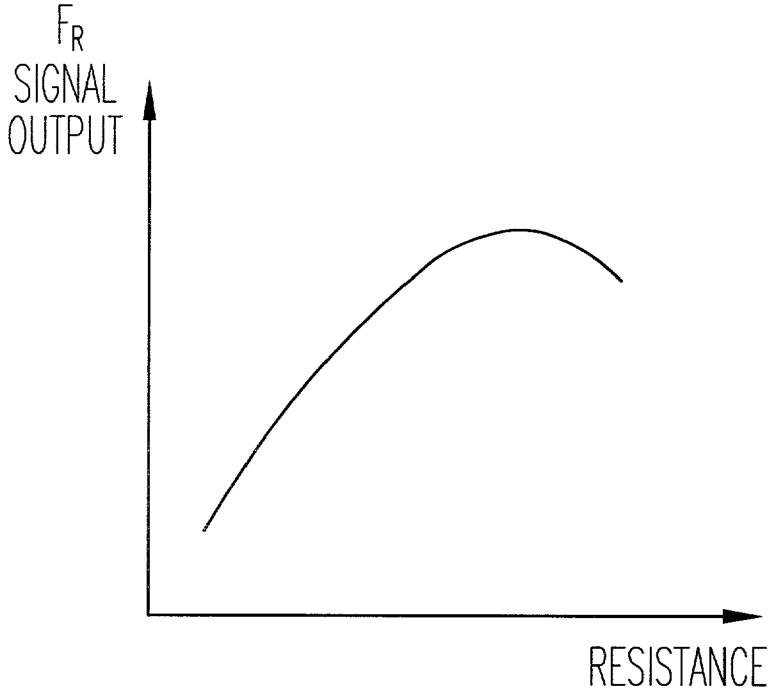
FIG. 4 is a plot of resistance vs. signal output from a magneto resistive element.

FIG. 4 is a plot 430 of stripe height (x axis) vs. the change resistance ("ΔR") (y axis) from a magneto resistive element 400. As can be seen, the ΔR (y axis) from a magneto resistive element 400 is maximum at a particular stripe height (x axis). The ΔR (y axis) is related to the stripe height (x axis) in that the magneto resistive element 152 has maximum ΔR for a given stripe height. As can be seen from the plot shown in FIG. 4, there is an optimal point 432 where the ΔR (y axis) from the magneto resistive element is optimum for a given stripe height. If the stripe height is less than the stripe height associated with the optimum point 432, the change in resistance ("ΔR") is less than the maximum. If the stripe height is thicker than the stripe height associated with the optimum point 432, ΔR is also less than the maximum.

MR elements 152 change resistance in the presence of a magnetic field. When a magnetic field is present, rotation of the MR element's magnetic moment produces the resistance change (Δ resistance) that in turn produces a voltage change across the conductor leads of the MR element according to $$\Delta V = I \Delta R$$

where I is the sensor current passing through the MR element 152. Thus, by maximizing ΔR, the output signal ΔV is also maximized.

Figure 5:
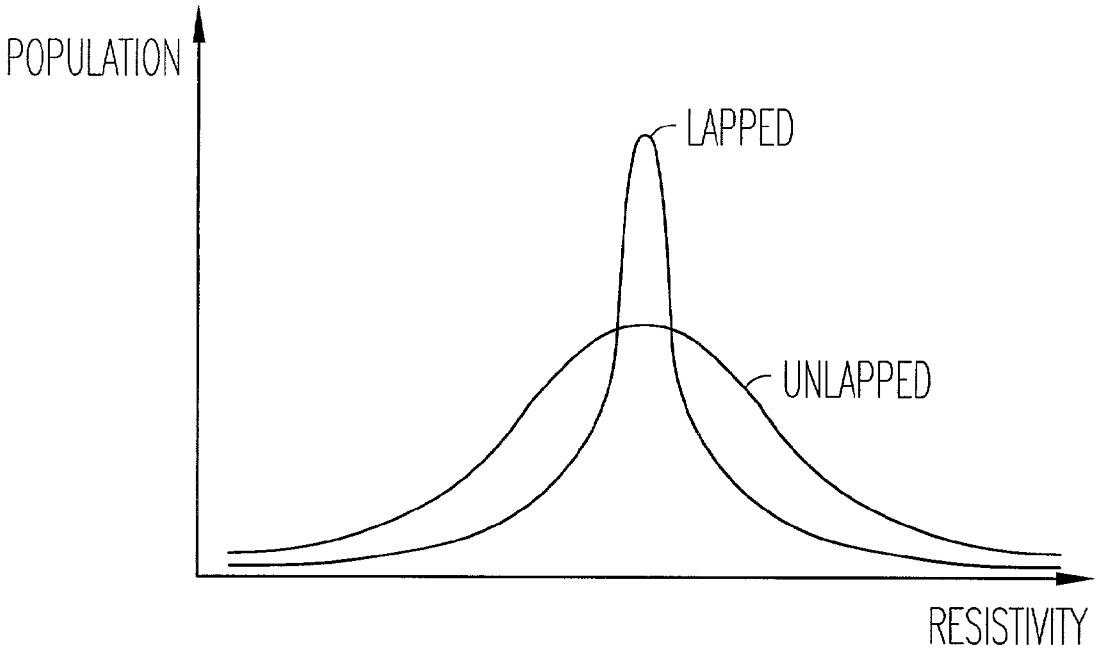
FIG. 5 is a chart showing the standard deviation among a population of magneto resistive elements that have been lapped and ion milled.

FIG. 5 is a chart showing the standard deviation among a population of magneto resistive elements that have all been uniformly lapped and ion milled. The standard deviation from the mean value of ΔR is somewhat high. In other words, the ΔR varies somewhat across the population of magneto resistive elements after all the MR elements are subjected to the same amount of lapping and ion milling. Not all the magneto resistive elements will operate at or near the optimum for ΔR optimum signal output, ΔV for a given sense current.

In order to narrow the standard deviation of a population of MR elements so that more of the MR elements will have optimum or maximum ΔR, it is necessary to use the method and apparatus described in more detail below to control the amount of material removed during the ion milling process so that the stripe height on individual heads may be controlled to produce ΔR values that are at or near the optimal values. Of course, producing MR elements with ΔR values near the maximum also produces MR elements that output maximum signal ΔV for a particular sense current I. In other words, by controlling the stripe height of various MR elements during manufacture, better, more uniform read signals ΔV result from a population of MR elements.

Figure 6:
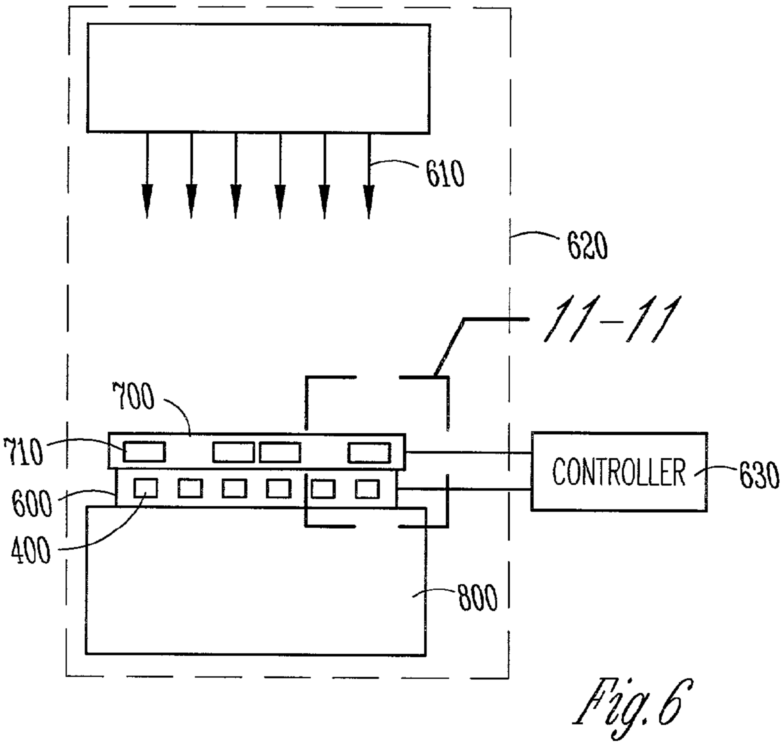
FIG. 6 is a schematic view of an elongated slice including a plurality of magneto resistive elements subjected to a broad ion beam and also showing a shutter system having at least some of the magneto resistive elements covered by a shutter.

FIG. 6 is a schematic view of an elongated slice 600 (which is a bar, sliced from a wafer, having a row of devices that will later be formed and diced into individual transducers) including a plurality of magneto resistive elements 400 (one for each eventual transducer). The elongated slice 600 may also be referred to as a rowbar. The slice and magneto resistive elements are held in a carrier 800. The carrier 800 and the slice 600 are placed in a vacuum chamber 620 and subjected to a broad ion beam, depicted by arrows 610. A shutter system 700 is used to cover some or all of the magneto resistive elements 400. The shutter system 700 includes a plurality of shutters 710 that can be actuated or moved between a position where a magneto resistive element 400 is uncovered and a position where the magneto resistive element is covered. As shown in FIG. 6, at least some of the magneto resistive elements covered by a shutter 710. When the shutters are in position to cover a magneto resistive element 400 they are shown as solid boxes. If still in the uncovered position, the shutters are not shown in FIG. 6.

A controller 630 is electrically attached to each of the magneto resistive elements and to the shutter system 700. The controller receives input from the magneto resistive elements 400. In other words, a property of the magneto resistive element is monitored during the ion milling process. In this case, the electrical resistance is measured across the magneto resistive element 400 while the magneto resistive elements are bombarded with the ion beam 610. Other properties that could be monitored could be the stripe height of the MR element or ΔR in a magnetic field. The carrier 800 provides the electrical connections between the individual magneto resistive elements 400 and the controller 630. When the resistance meets a selected value or falls within a selected range for a particular magneto resistive element, the controller 630 sends a signal to an actuator (shown in FIG. 7) that moves a shutter 710 over the particular magneto resistive element 400 so as to minimize or substantially halt further removal of material from the particular magneto resistive element 400. The shutter 700 is moved during the ion milling operation. In other words, the ion milling semiconductor fabrication process continues while the various shutters 710 are moved from an uncovered position to a covered position. Each shutter 710 acts like a mask in that it shields or substantially shields the portion of the slice 600 of the wafer having a particular magneto resistive element therein from the semiconductor fabrication step, in this case ion milling which is also known as ion beam etching or sputter etching. Without any limitation intended, the shutter system 700 and the individual shutters 710 are also referred to herein as the dynamic mask.

Figure 7:
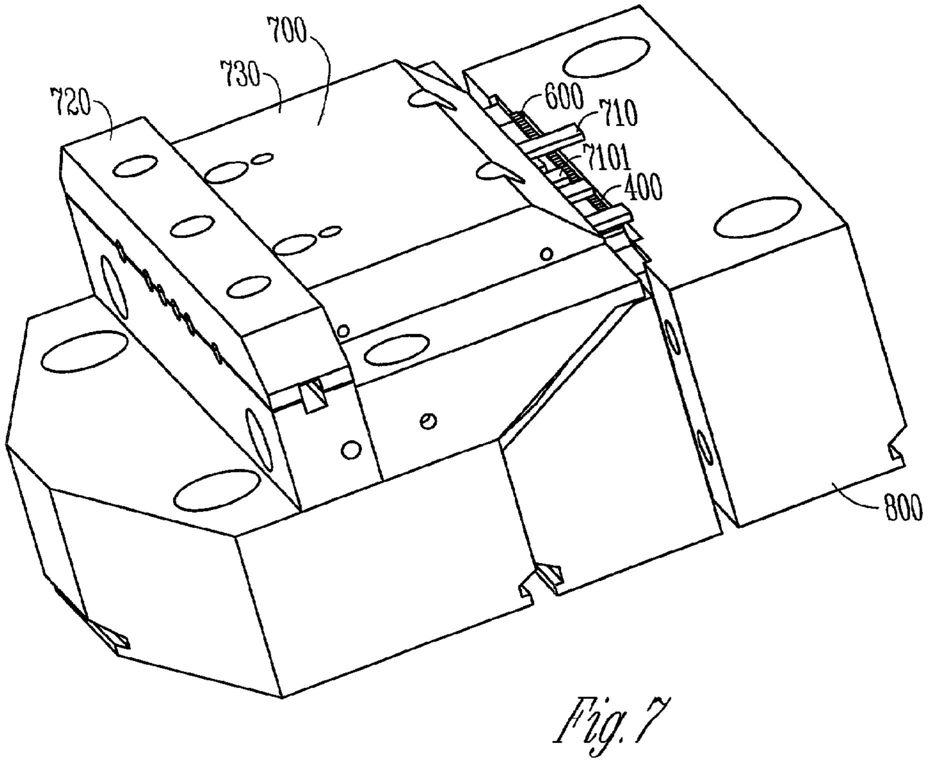
FIG. 7 is an isometric view of one embodiment of a carrier and shutter system.

FIG. 7 is an isometric view of one embodiment of a carrier 800 and shutter system 700. The shutter system includes the plurality of shutters 710, and actuator 720, also termed as a shutter actuator, and a cover 730 for the shutter 710. The carrier 800 carries the slice 600 of a wafer that includes a plurality of magneto-resistive elements in spaced relation to one another. The slice 600 is an elongated member that has a number of magneto-resistive elements shown as white boxes 400 in FIG. 7. In some embodiments, as many as 64 magneto-resistive elements are positioned on one slice 600 of a wafer. In other embodiments, this number will go up as the size of the magneto-resistive elements 400 becomes smaller. The slice 600 is held by the carrier 800 during initial lapping and is attached to the shutter system 700 before being placed into the vacuum chamber 620 for ion milling. This can be seen in FIG. 7. Each shutter 710 covers more than one magneto-resistive element 400. In this particular embodiment, the shutter 710 covers approximately 4 magneto-resistive elements 400. The shutter actuator 720 contains a mechanism that moves the individual shutter 710 between an open position or an uncovered position and a covered position. As shown in FIG. 7, the shutter identified by reference numeral 710 is in a closed position, or covered position, where the shutter 710 covers one or more of the magneto-resistive elements 400 associated with the strip 600. Shutter 7101 is in an open position, where the MR elements 400 near the shutter are still exposed to an ion beam. The shutter actuator 720 includes a mechanism that moves the shutter 710 from the open position to a closed position and vice versa. Typically while in a vacuum chamber the shutter actuator 720 moves the shutters from open to a closed position, where the shutter 710 covers the actuator, or the MR elements, or MR element 400. At the conclusion of the ion milling process, the shutter actuator 720 moves the shutters back to an open or uncovered position so that the carrier 800 may be detached from the shutter system 700 without damaging the individual shutters, such as 710 and 7101.

Figure 8:
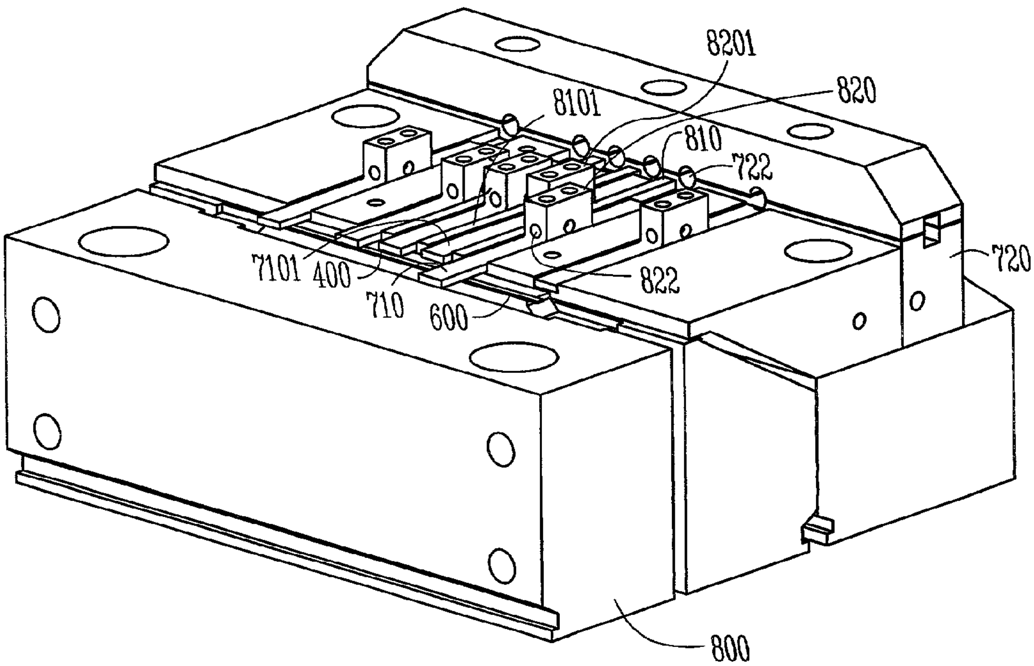
FIG. 8 is an isometric view of the embodiment of a carrier and shutter system shown in FIG. 7 in which a cover portion of the shutter system has been removed.

FIG. 8 is an isometric view of one embodiment of the carrier 800 and shutter system 700 shown in FIG. 7, in which the cover portion 730 has been removed so that the actuator 720 and the mechanism associated with the shutter 710 and 7101 can be more clearly shown. The shutter 7101 and 710 are essentially rectangular flat blades that slide in a guide way 810 and 8101. The guide way is dimensioned so that the individual shutters 710 and 7101 will slide within the guide way without binding or catching. Attached to each of the shutters 710 and 7101 is a block 820 and 8201. Rather than describe two blocks, the single block will be described for the sake of simplicity. The block 820 includes an opening 822 therein. The opening receives a cable that is threaded through the opening 822. The cable has a stop on the end as well as a stop on the other end of the opening 822. The cable passes through the opening 822 as well as through a corresponding opening 722 in the shutter actuator 720. The shutter actuator moves the cable so that the block 820 and the corresponding shutter 710 can be moved between a first position where the shutter 710 does not cover any of the MR elements 400 in the strip 600 of MR elements held by the carrier 800, and a closed or second covering position where the shutter 710 covers at least one MR element in the strip 600. As shown in FIG. 8 the shutter 710 is wide enough to cover multiple MR elements 400.

Figure 9:
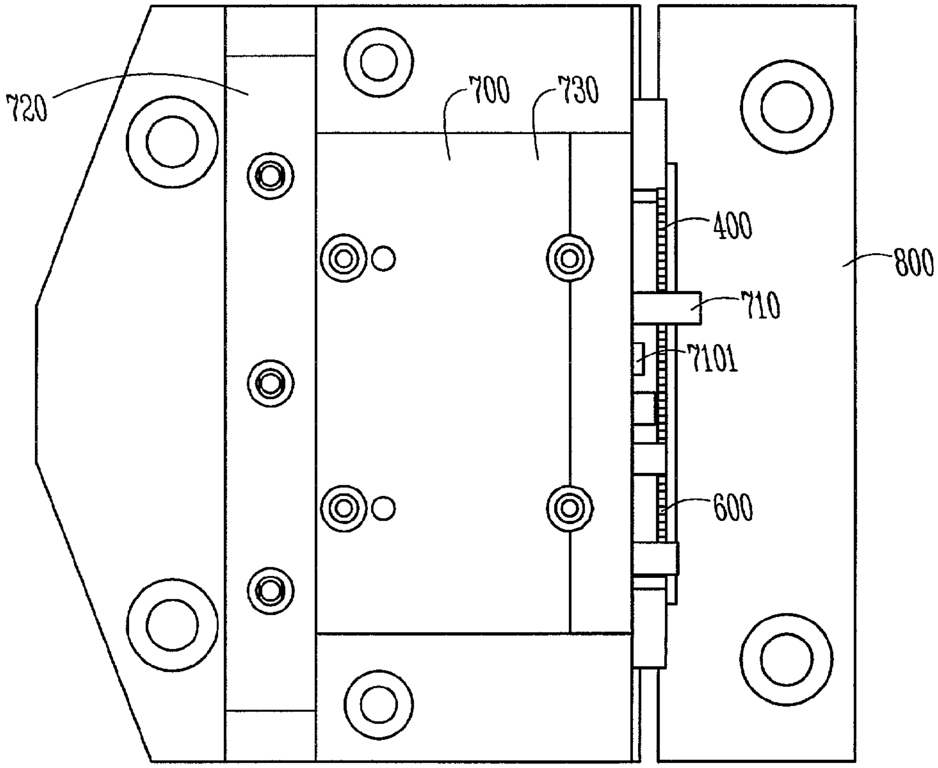
FIG. 9 is a top view of the embodiment of the carrier and shutter system shown in FIGS. 7 and 8.

FIG. 9 is a top view of one embodiment of a carrier 800 and shutter system 700 shown in FIGS. 7 & 8. FIG. 9 shows the shutter 710 in a covering or a closed position, and shutter 7101 in an open position. It can also be seen that the strip 600 that contains multiple MR elements 400 is attached to the carrier 800. The shutter 710 covers approximately 4 MR elements 400. The shutters 710 and 7101 move laterally over the strip 600 containing individual MR elements 400. The carrier 800 is attached to a block below the shutter system.

Figure 10:
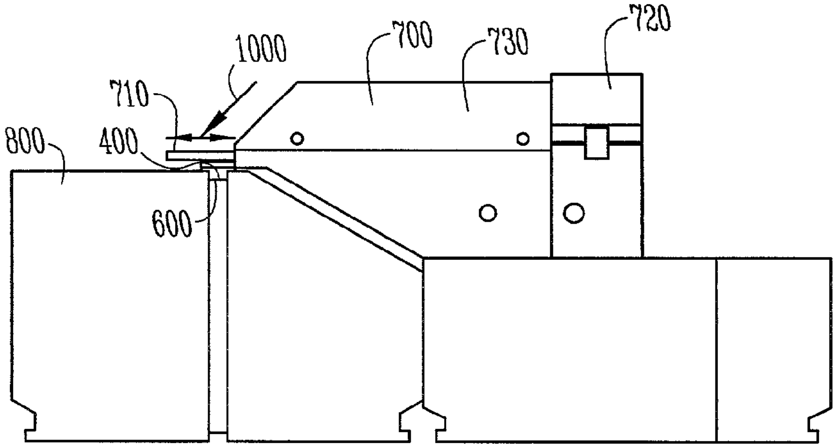
FIG. 10 is a side view of the embodiment of the carrier and shutter system shown in FIGS. 7 and 8.

FIG. 10 is a side view of the embodiment of the carrier 800 and shutter system 700 shown in FIGS. 7 and 8. In FIG. 10 the shutter 710 is shown in a closed position. The arrow 1000 shows the motion of the blade 710 as it translates between open and closed positions, or a first and a second position.

Figure 11:
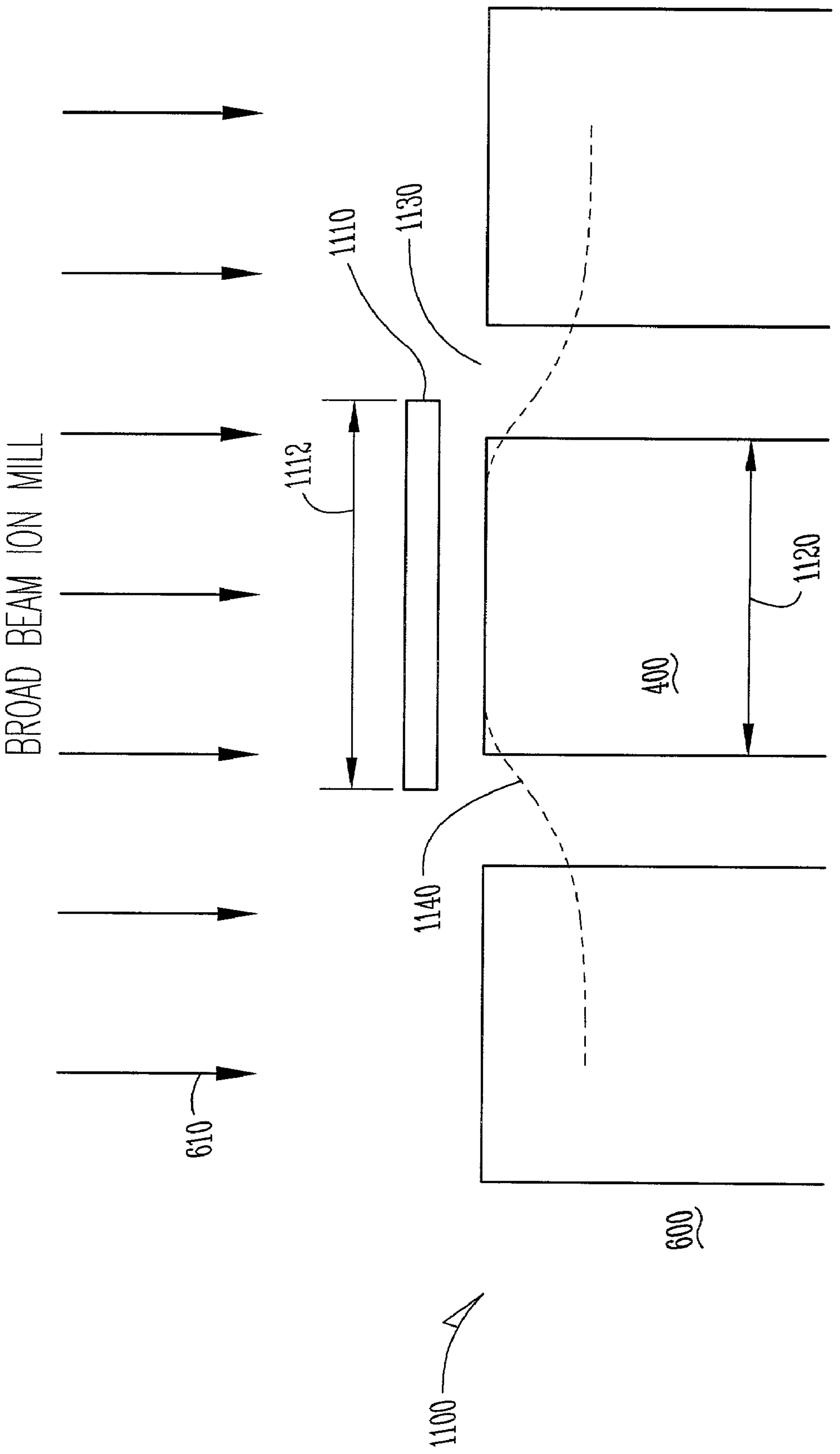
FIG. 11 is a schematic side view of another embodiment of a shutter system in which the shutter covers one magneto resistive element.

FIG. 11 is a schematic view of another embodiment of a shutter system 1100 in which the shutter 1110 covers a single or one magneto-resistive element 400. The shutter system 1100 has a plurality of shutters 1110. Each of the shutters 1110 covers a single magneto-resistive element 400. As shown in FIG. 11, only one shutter 1110 is shown covering the magneto-resistive element 400. The magneto-resistive element 400 has a certain width dimension 1120 and the shutter 1110 has a width dimension 1112. It should be noted that the width dimension of the shutter 1112 is larger than the width dimension of 1120 of the magneto-resistive element 400. The slice 600 of the wafer that forms a plurality of MR elements 400 in spaced relation to one another also leaves a space in between each of the individual magneto-resistive elements 400 so that they may be cut apart from one another. The spacing between the MR elements 400 is called a dice line 1130. After an appropriate amount of material has been removed from each of the MR elements so that the resistance of each MR element of the group in the slice 600 is approximately the same the MR elements, or more specifically the portions of ceramic surrounding the MR elements, will be diced to form individual sliders. The reason that the shutter 1110 has a width 1112 wider than the width 1120 of the slider is because the ion beam used for the ion mill, as depicted by arrows carrying the reference numeral 610, does not drop exactly straight down, but in fact comes at slightly different angles such that the shutter will not perfectly mask the entire surface of the slider but will result in a round-off of the comers as depicted by dotted line 1140. In other words, because the broad ion beam does not drop down perpendicular to the shutter and to the elongated strip of material containing the MR elements 400, there will be some undercutting near the dice lines 1130. As a result it is necessary to make the shutter widths 1112 slightly larger than the width of the slider 1120.

Figure 12:
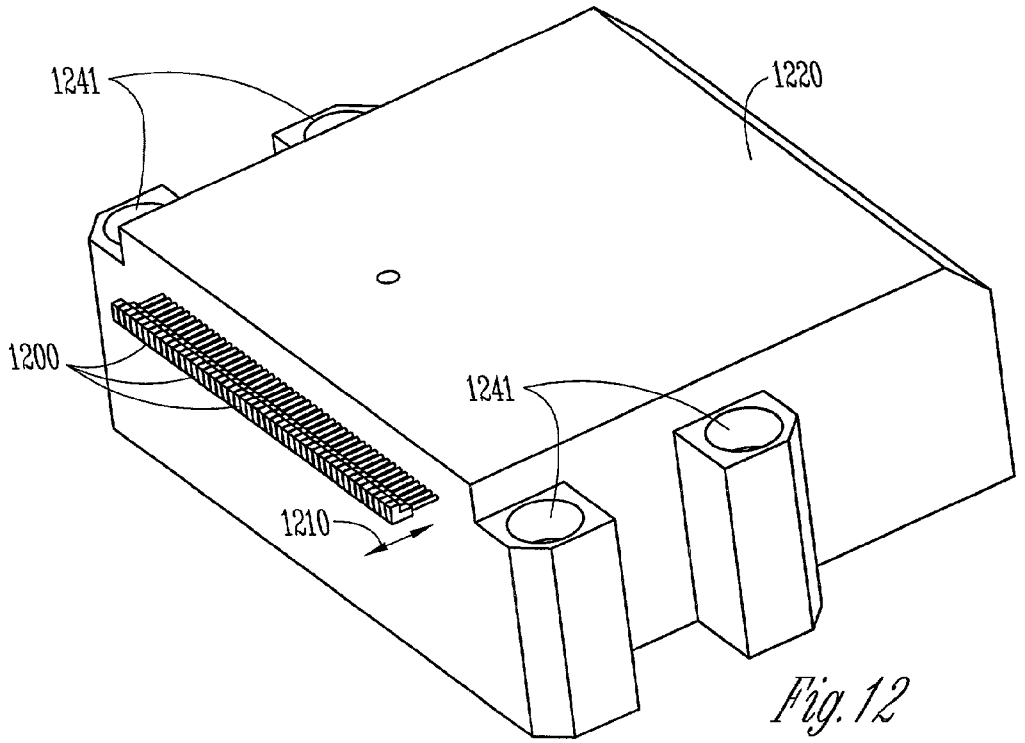
FIG. 12 is an isometric view of another embodiment of an actuator for a shutter system in which the shutter covers one magneto resistive element.

FIG. 12 is an isometric view of another embodiment of an actuator 1220. This actuator 1220 replaces the actuator 720 in the second embodiment. The actuator 1220 includes a plurality of hook elements 1200 that can be moved into and out of the translator in the direction of arrow 1210 to place shutters, which are attached to the hooks, in one of two positions. Of course the two positions either place the shutter covering an individual MR element 400 or remove the shutter and leave the MR element uncovered so that the ion milling can take place on that particular MR element 400 until the resistance associated with the MR element 400 is within a specified level. The actuator 1220 is attached to the shutter system using fasteners that are passed through openings 1241.

Figure 13:
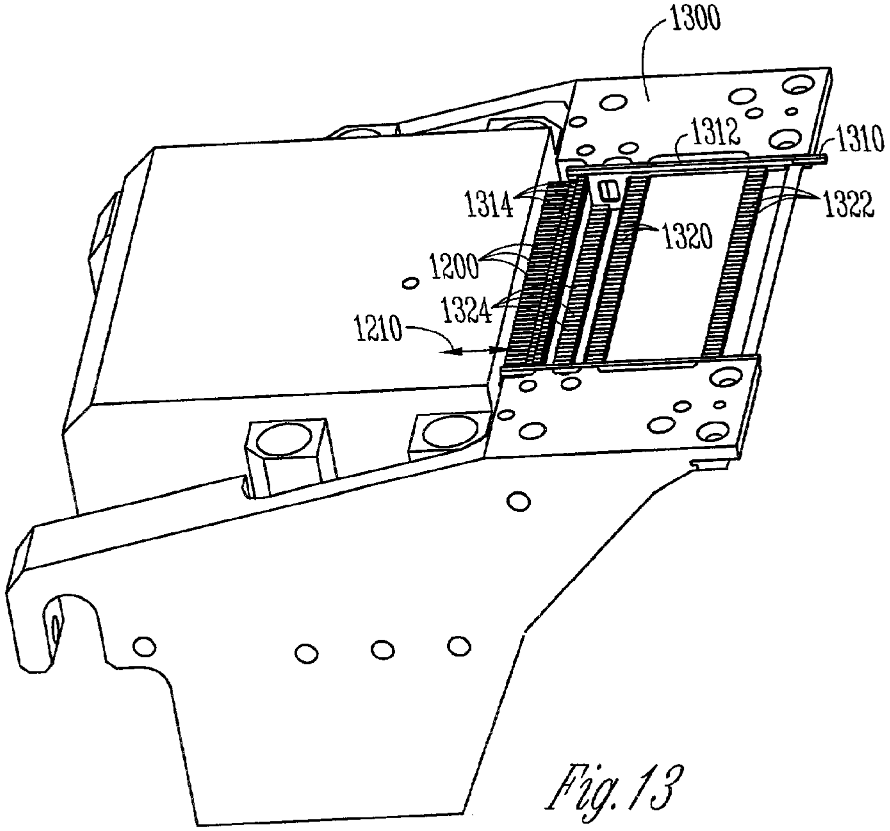
FIG. 13 is an isometric view of another embodiment of an actuator and shutter system shown in FIG. 12 in which a cover portion of the shutter system has been removed.

FIG. 13 is an isometric view of an actuator 1220 and shutter system 1300. In this particular view, a cover portion has been removed to facilitate description of the shutter system 1300. The shutter system 1300 includes shutters 1310 that cover or uncover individual sites having MR elements 400 therein. The shutters 1310 are on the end of an elongated shutter arm 1312. The shutter arm 1312 also includes an end having a hook receiving portion 1314. The hook receiving portion 1314 corresponds to the hook shape associated with the actuator hooks 1200 from the actuator system 1220. The elongated shutter actuator arms fit within guide ways 1320, 1322, and 1324. These guide ways prevent the elongated shutter arms 1312 from binding as they are moved between an open position and a closed position. It should be noted that the length of travel of the elongated shutter arm 1312 and the shutter 1310 is relatively short. In essence, the shutter 1310 only has to travel the width of a slider that is approximately 1.5 mm.

Figure 14:
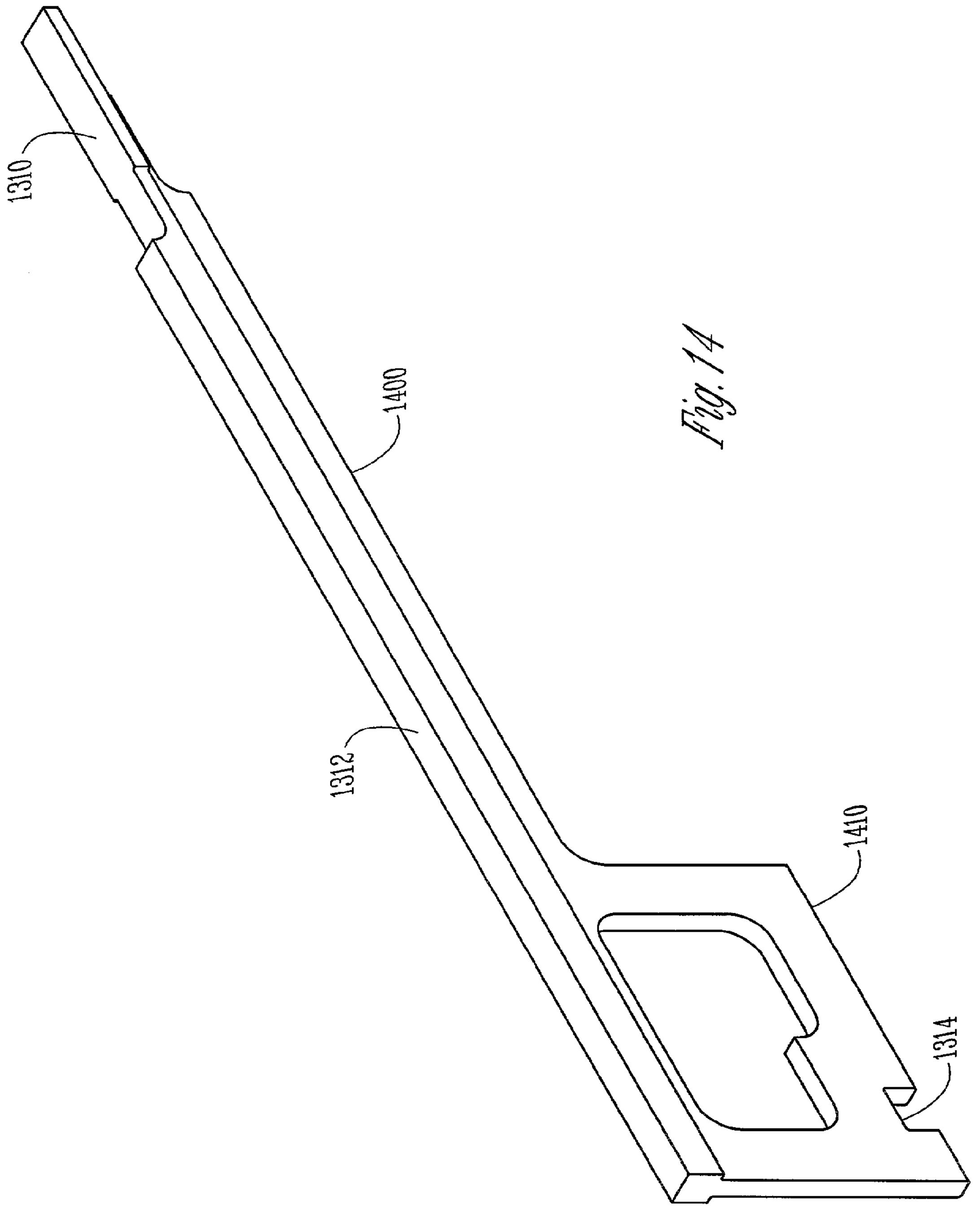
FIG. 14 is an isometric view of one of the shutters associated with the embodiment shown in FIGS. 12 and 13.

FIG. 14 is an isometric view of one of the shutters 1310 associated with the shutter system shown in FIG. 13. The shutter 1310 includes an elongated shutter arm. The shutter 1310 is located on one end of the elongated arm and the other end of the arm includes an end that engages the hook 1210 associated with the actuator 1200. The arm also includes bearing surfaces 1400 and 1410 that fit within guide ways within the shutter system 1300. The bearing surfaces 1400 and 1410 are dimensioned to fit within the guide ways with adequate tolerance to allow the shutters 1310 to slip without binding during their length of travel.

Figure 15:
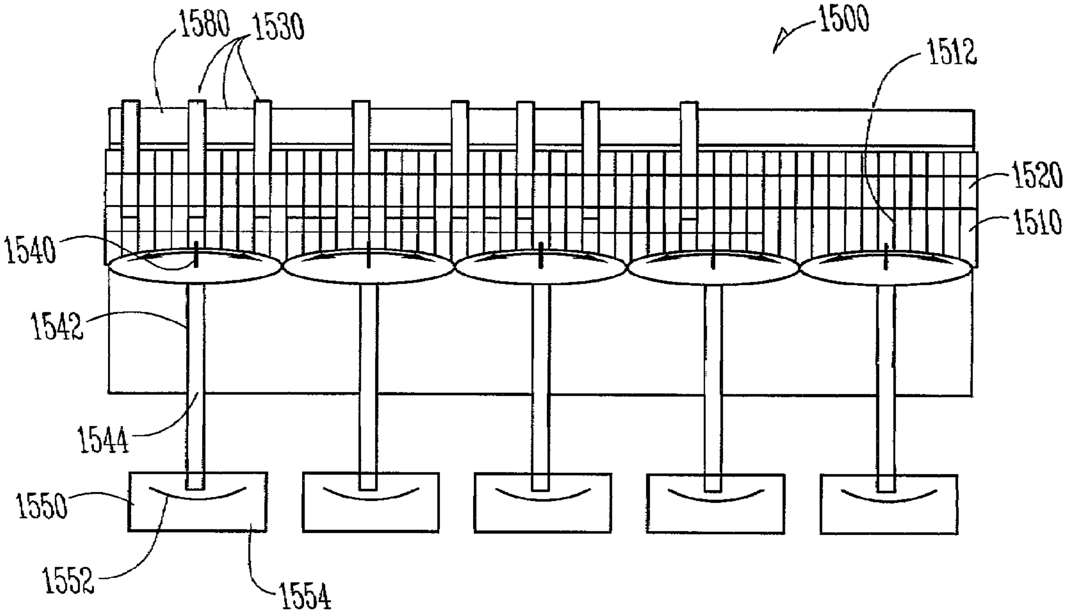
FIG. 15 is a schematic top view of another embodiment of the shutter system.
Figure 16:
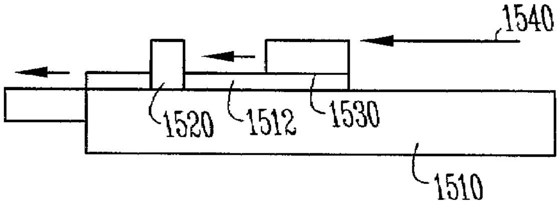
FIG. 16 is a side view of the block and shutter from the embodiment shown in FIG. 15.

FIG. 15 is a schematic top view of another embodiment of a shutter system 1500. FIG. 16 is a side view of a block and shutter from the embodiment shown in FIG. 15. The shutter system, as shown in both FIGS. 15 and 16, includes a soak block 1510, a stop block 1520 and a shutter 1530. The soak block 1510 includes a series of fins 1512 that are used to guide and capture the moving shutters 1530. The fins are approximately less than 0.002 inches thick and are aligned along the dice lines associated with the bar that includes a plurality of undiced ceramic blocks including MR elements. The bar carries the reference numeral 1580 and is not part of the shuttering device 1500. Individual shutters 1530 are placed over the various portions of the bar 1580 to stop the removal of material once the appropriate electrical characteristics of the MR element have been achieved. The fins are aligned along the dice lanes on the bar 1580. The shutters or individual shutters 1530 are moved by a mover or actuator 1540. The mover or actuator 1540 is positioned on a rotatable arm 1542. The actuator or mover 1540 is positioned at a free end of the arm 1542. The arm 1542 pivots about a pivot point 1544. On the other end of the arm 1542 is a voice coil motor 1550 that includes a voice coil 1552 and one or more magnets 1554. The voice coil motor 1550 is used to move the arm 1542 about pivot point 1544. By moving the arm 1542, the actuator or mover 1540 is also moved and can be quickly positioned to one of several shutters 1530. The mover 1540 can then be used to place a force on the shutter 1530 moving it to a position over the bar 1580 so that the portion of the bar 1580 underneath the shutter 1530 is no longer exposed to an operation where material is removed from the bar 1580. The actuator 1540 pushes the shutter 1530 forward to cover the bar 1580 which in turn stops the milling process for that slider or for the MR element attached in that location of the bar 1580. The stop block 1520 is used to stop the shutter 1530. The stop block 1520 also resets the shutters 1530 when milling is completed for the entire bar 1580. The use of a voice coil motor 1550 and an arm 1542 allows for the actuator or mover 1540 to be used on one of several shutters 1530. The arm and the actuator and specifically its actuator end 1540 move in a arc and will generally be able to activate about 10 different individual shutters 1530. The fins 1512 guide the shutter 1530 into position despite the fact that the actuator end 1540 may place a slight side load on the individual shutters 1530. The stop block 1520 is then used to reset the shutter 1530 after an ion milling operation has been completed.

It should be noted that more than one of the actuator shutter systems holding a strip of MR elements can be placed within a vacuum chamber at one time. For example multiple actuator systems holding the strips of MR elements 400 can be placed into a single vacuum chamber 620 and subjected to broad beam ion milling. Each of the MR elements can be attached to the respective controllers for the actuator shutter systems holding them such that each individual shutter can be actuated as the resistance of the MR element comes into a selected range. It is also contemplated that more than one actuator shutter system could be attached to a single controller. A single controller could then control the actuation of more than one of the actuators to move shutters to a covering position over various MR elements into actuator shutter systems.

Figure 17:
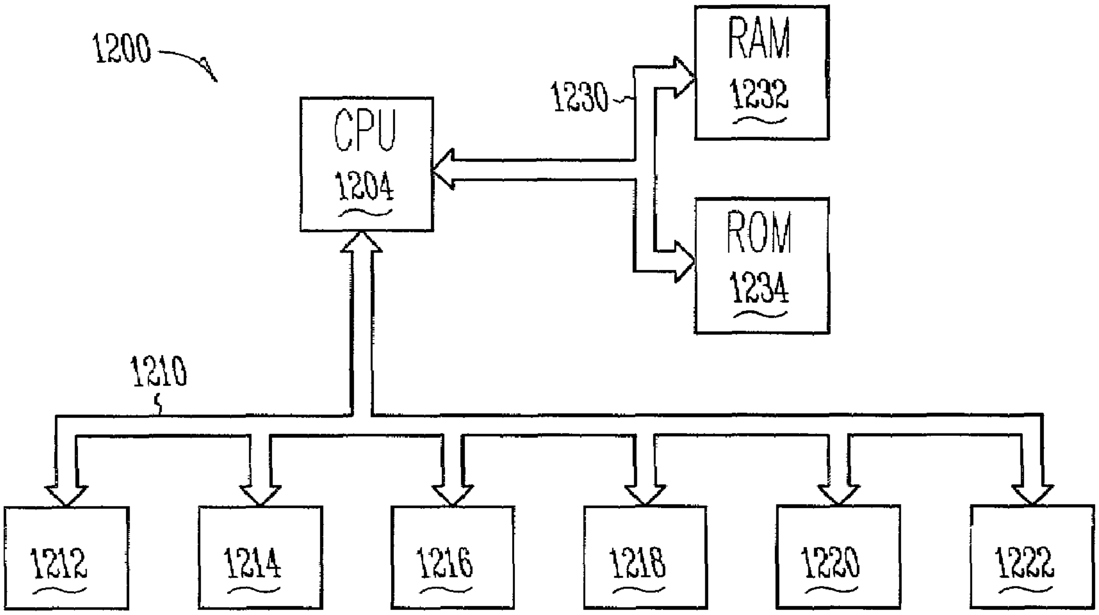
FIG. 17 is a schematic view of a computer system.

Referring now to FIG. 17, which is a chart showing standard deviation among magneto-resistive elements that have been lapped and ion milled only, in bulk, which carries reference number 1710 as compared to a sample of magneto-resistive elements that have been made using the instant invention represented by curve 1720. The comparison shows that the standard deviation of the magneto-resistive elements 400 that have been ion milled using the actuator and shutter system have much lower standard deviation about the ΔR value of MR elements. The ΔR value will correspond to the optimum ΔR value discussed previously. This allows designers to design to a particular optimum level of resistivity for all the transducers 150, and helps disc drives achieve increased aerial density as compared to other methods.

Advantageously, the method and apparatus allows for careful control of the dimensions of an MR element or set of MR elements so that the signal output of each MR element can be within a selected, optimized range. The method and apparatus is both quick and reliable, such that the method and apparatus can be used in production of MR elements for disc drives. As a result of the ability to control dimensions or a particular dimension of the MR element, information stored at higher areal density can be reliably detected or read. Yet another advantage is that MR elements in a population can be made to be more uniform across a population of MR elements. In other words, the standard deviation of the MR elements is reduced which enhances the ability to introduce higher capacity disc drives using this technology. Thus, disc drives capable of still further increases in storage capacity can be produced at the manufacturing level.

FIG. 18 is a schematic view of a computer system. Advantageously, the invention is well-suited for use in storing and retrieving information in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device that includes transducers formed using the method and apparatus described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the slider having the surface treatment discussed above.

CONCLUSION

A method for producing magneto resistive heads includes the steps of positioning at least two magneto resistive elements in spaced relation to one another and placing the at least two magneto resistive elements in an environment where material is removed nonselectively from items in the environment. A property of at least two of the plurality of magneto resistive elements is monitored. In response to monitoring, one of the at least two magneto resistive elements is dynamically covered to prevent additional removal of material from the covered magneto resistive element. The monitoring step further includes the steps of electrically connecting the at least two magneto resistive elements, and measuring the electrical resistance of the at least two magneto resistive elements. Dynamically covering one of the magneto resistive elements takes place when the electrical resistance of at least one of the magneto resistive elements meets a selected level. In one embodiment, the method includes placing the at least two magneto resistive elements in an ion milling environment. The step of dynamically covering one of the at least two of the magneto resistive elements further includes actuating a shutter to substantially cover one of the at least two magneto resistive elements during ion milling. The shutter has a width that is larger than the width of one magneto resistive element.

An device for use in semiconductor fabrication includes a carrier, an elongated element held by the carrier, and a dynamic mask that can be used to selectively cover portions of the elongated element during semiconductor processes to substantially halt the semiconductor process with respect to the covered portion of the elongated element. The dynamic mask further includes a first shutter, a second shutter, and an actuator for moving the first shutter and the second shutter. The device also includes a controller for the actuator. The controller actuates each of the first shutter and the second shutter between an open position where the shutter is not covering a portion of the elongated element and a covering position where the shutter is covering a portion of the elongated element. The device further includes a mechanism for measuring a property associated with a selected portion of the elongated element. The controller actuates the first shutter and the second shutter in response to a selected value of a measured property. In one embodiment, the elongated element is a row of a plurality of magneto resistive elements sliced from a wafer.

In another embodiment, at least two of the magneto resistive elements of the row of a plurality of magneto resistive elements are monitored for electrical resistance. The controller actuates each of the first shutter and the second shutter between an open position, where the shutter is not covering a portion of the elongated element, and a covering position, where the shutter (the first or second, as the case may be) is covering a portion of the elongated element in response to the electrical resistance associated with that portion of the elongated element being at a predefined value. In one sub-embodiment, the first shutter has a width larger than the width of at least one magneto resistive element. In another sub-embodiment, the first shutter has a width larger than the width of one magneto resistive element and less than the width of two magneto resistive elements. In still another sub-embodiment, the first shutter has a width larger than the width of at least two magneto resistive elements. The electrical resistance is measured during the semiconductive process of ion milling and the controller moves at least one of the first shutter and the second shutter over at least one of the magneto resistive elements during the process of ion milling. The shutter has a width to substantially protect the magneto resistive element below the shutter from removal of material when the shutter is placed in a covering position over the magneto resistive element. A magneto resistive element includes a stripe having a stripe height. The resistance measured across a magneto resistive element is related to the stripe height.

Most generally, a device for use during a semiconductor fabrication process includes a target and a mechanism for covering a portion of a target to prevent exposure to that portion of the target from the semiconductor fabrication process while the uncovered portion remains subjected to the semiconductor process.

Although the specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. It is to be understood that the above description is intended to be illustrative, and not restrictive. Combinations of the above embodiments and other embodiments will be apparent to those of skill in the art upon reviewing the above description. The scope of the invention includes any other applications in which the above structures and fabrication methods are used. Accordingly, the scope of the invention should only be determined with reference to the appended claims, along with the full scope of equivalents to which such claims are entitled.

What is claimed is:

1. An apparatus for use in a wafer process comprising:

a magneto resistive element; and a mask including a first shutter, a second shutter, and an actuator for moving the first shutter and second shutter, a controller, wherein said controller is structured to monitor at least an electrical resistance of the magneto resistive element during ion milling of the magneto resistive element, further wherein the controller is structured to independently actuate each of the first and second shutter based on the electrical resistance of the magneto resistive element.

2. The apparatus of claim 1 wherein the mask is a dynamic mask.

3. The apparatus of claim 2 wherein the controller actuates each of first shutter and second shutter between an open position where the first and second shutter is not covering a portion of the magneto resistive element and a covering position, where the first and second shutter is covering a portion of the magneto resistive element.

4. The apparatus of claim 2 wherein the magneto resistive element is a row of a plurality of magneto resistive elements sliced from a wafer.

5. The apparatus of claim 4 wherein the controller actuates each of the first shutter and the second shutter between an open position where the at least one of the first and second shutter is not covering a portion of the magneto resistive element, and a covering position where the at least one of the first and second shutter is covering a portion of the magneto resistive element, in response to the electrical resistance associated with that portion of the magneto resistive element being at a predefined value.

6. The apparatus of claim 5 wherein the first shutter has a width larger than the width of at least one magneto resistive element.

7. The apparatus of claim 5 wherein the first shutter has a width larger than the width of one magneto resistive element and less than the width of two magneto resistive elements.

8. The apparatus of claim 5 wherein the first shutter has a width larger than the width of at least two magneto resistive elements.

9. The apparatus of claim 5 wherein the electrical resistance is measured during the wafer process of ion milling.

10. The apparatus of claim 9 wherein the first and second shutter have a width to substantially protect the magneto resistive element below the first and second shutter from removal of material when the shutter is placed in a covering position over the magneto resistive element.

11. The apparatus of claim 1, wherein the magneto resistive element includes a stripe having a stripe height, further wherein the electrical resistance monitored is related to the stripe height.

12. An apparatus for use during a semiconductor fabrication process comprising.

a plurality of magneto resistive elements having a plurality of stripes;

a mask having a plurality of shutters positioned adjacent the plurality of magneto resistive elements; and controller means for monitoring an electrical property level associated with the plurality of stripes, and independently actuating each of the plurality of shutters based on each of the plurality of stripes electrical property level during the fabrication of each of the plurality of stripes.

13. An apparatus for use in a wafer process comprising:

a carrier;

an elongated element including a plurality of magneto resistive elements held by the carrier;

a mask including at least one shutter and an actuator for moving the at least one shutter, wherein said mask is used to selectively cover a first portion of the elongated element as an ion mill wafer process continues to act on a second portion of the elongated element, the ion mill wafer process substantially halting with respect to the first portion of the elongated element; and a controller, wherein said controller is structured to monitor an electrical property level of the elongated element, further wherein the controller is structured to independently actuate the at least one shutter based on the monitored electrical property level.

14. The apparatus of claim 13 wherein the mask is a dynamic mask.

15. The apparatus of claim 14 further comprising a controller for the actuator, the controller actuating the at least one shutter between an open position where the at least one shutter is not covering a portion of the elongated element and a covering position where the at least one shutter is covering a portion of the elongated element.

16. The apparatus of claim 14 wherein the controller actuates the at least one shutter between an open position, where the at least one shutter is not covering a portion of the elongated element, and a covering position where the at least one shutter is covering a portion of the elongated element.

17. The apparatus of claim 14, wherein the at least one shutter has a width to substantially protect the plurality of elongated elements below the at least one shutter from removal of material where the shutter is placed in a covering position of the plurality of magneto resistive elements.

18. The apparatus of claim 13, wherein at least one magneto resistive element selected from the plurality of magneto resistive elements includes a stripe having a stripe height, the electrical property level monitored across the at least one magneto resistive element is related to the stripe height.

19. An apparatus for use in a wafer process comprising:

a carrier;

an elongated element held by the carrier, wherein the elongated element includes a plurality of magneto resistive elements;

a mask including at least one shutter and an actuator for moving the at least one shutter, wherein said mask is used to selectively cover a first portion of the elongated element as an ion mill wafer process continues to act on a second portion of the elongated element, the ion mill wafer process substantially halting with respect to the first portion of the elongated element; and a controller for the actuator, the controller actuating the at least one shutter between an open position where the at least one shutter is not covering a portion of the elongated element, and a covering position where to at least one shutter is covering the portion of the elongated element, in response to a monitored electrical resistance associated with at least one of the plurality of magneto resistive elements.

20. The apparatus of claim 19 wherein the mask is a dynamic mask.

21. The apparatus of claim 19, wherein the controller moves the at least one shutter over a portion of the elongated element, wherein the at least one shutter has a width to substantially protect the elongated element below the at least one shutter from removal of material where the shutter is placed in a covering position of the portion of the elongated element.

22. The apparatus of claim 19, wherein said elongated element includes a stripe having a stripe height, further wherein the electrical resistance monitored across the elongated element is related to the stripe height.

* * * * *